(12) United States Patent
Purdy et al.

(10) Patent No.: US 11,292,961 B2
(45) Date of Patent: Apr. 5, 2022

(54) USING SYNTHETIC ACID COMPOSITIONS AS ALTERNATIVES TO CONVENTIONAL ACIDS IN THE OIL AND GAS INDUSTRY

(71) Applicant: Fluid Energy Group LTD., Calgary (CA)

(72) Inventors: Clay Purdy, Medicine Hat (CA); Alexander David Jamieson, Calgary (CA); Markus Weissenberger, Calgary (CA)

(73) Assignee: FLUID ENERGY GROUP LTD., Calgary (CA)

( * ) Notice: Subject to any disclaimer, the term of this patent is extended or adjusted under 35 U.S.C. 154(b) by 78 days.

(21) Appl. No.: 16/837,830

(22) Filed: Apr. 1, 2020

(65) Prior Publication Data
US 2020/0224086 A1 Jul. 16, 2020

Related U.S. Application Data

(62) Division of application No. 16/316,895, filed as application No. PCT/CA2017/000181 on Jul. 28, 2017, now Pat. No. 11,098,241.

(51) Int. Cl.
| | | |
|---|---|---|
| C09K 8/74 | (2006.01) | |
| C09K 8/528 | (2006.01) | |
| C09K 8/54 | (2006.01) | |
| C09K 8/66 | (2006.01) | |
| C09K 8/68 | (2006.01) | |
| C23G 1/08 | (2006.01) | |
| C23G 1/02 | (2006.01) | |
| C23G 1/04 | (2006.01) | |
| C23F 11/04 | (2006.01) | |
| E21B 43/22 | (2006.01) | |
| E21B 37/06 | (2006.01) | |
| E21B 43/26 | (2006.01) | |

(52) U.S. Cl.
CPC ............ *C09K 8/74* (2013.01); *C09K 8/528* (2013.01); *C09K 8/54* (2013.01); *C09K 8/665* (2013.01); *C09K 8/68* (2013.01); *C23F 11/04* (2013.01); *C23G 1/02* (2013.01); *C23G 1/04* (2013.01); *C23G 1/088* (2013.01); *E21B 43/26* (2013.01); *C09K 2208/32* (2013.01)

(58) Field of Classification Search
CPC ........ C09K 8/74; C09K 2208/32; C09K 8/54; C09K 8/528; C09K 8/602; E21B 43/26; E21B 41/02; E21B 43/283
See application file for complete search history.

(56) References Cited

U.S. PATENT DOCUMENTS

2015/0344771 A1* 12/2015 Jiang .................. C09K 8/74
166/305.1

FOREIGN PATENT DOCUMENTS

| CA | 2865855 A1 | 4/2015 |
|---|---|---|
| CA | 2866513 A1 | 4/2016 |

OTHER PUBLICATIONS

Office Action dated Feb. 11, 2019 in CA Application No. 2,974,757, 5 pages.
Office Action dated May 21, 2019 in CA Application No. 2,974,757, 3 pages.

* cited by examiner

Primary Examiner — Zakiya W Bates
(74) Attorney, Agent, or Firm — Berg Hill Greenleaf Ruscitti, LLP.

(57) ABSTRACT

An aqueous synthetic acid composition is provided for use in oil industry activities The composition comprises: lysine and hydrogen chloride in a molar ratio ranging from 1:3 to 1:12.5, preferably from more than 1:5 to 1:8.5 The composition may further comprise a metal iodide or iodate and an alcohol or derivative thereof. The composition demonstrates advantageous properties for synthetic acids at temperatures above 90° C. The composition is useful in various oil and gas industry operations. Preferred embodiments of the composition provide substantial advantages in matrix acidizing by increasing the effectiveness of wormholing.

1 Claim, 4 Drawing Sheets

USING SYNTHETIC ACID COMPOSITIONS AS ALTERNATIVES TO CONVENTIONAL ACIDS IN THE OIL AND GAS INDUSTRY

CROSS REFERENCE TO RELATED APPLICATIONS

This application is a divisional application of U.S. application Ser. No. 16/316,895, filed Jan. 10, 2019; which is a National Stage Application of International Application No. PCT/CA2017/000181, filed Jul. 28, 2017; which claims the benefit of and priority to Canadian Application No. 2,937,490, filed Jul. 29, 2016. The entire specifications and figures of the above-referenced applications are hereby incorporated in their entirety by reference.

FIELD OF THE INVENTION

This invention relates to compositions for use in performing various applications in the oil & gas industry, more specifically to aqueous synthetic acid compositions as alternatives to conventional acids over a broad range of temperatures.

BACKGROUND OF THE INVENTION

In the oil & gas industry, stimulation with an acid is performed on a well to increase or restore production. In some instances, a well initially exhibits low permeability, and stimulation is employed to commence production from the reservoir. In other instances, stimulation or remediation is used to further encourage permeability and flow from an already existing well that has become under-productive due to scaling issues or formation depletion.

Acidizing is a type of stimulation treatment which is performed above or below the reservoir fracture pressure in an effort to initiate, restore or increase the natural permeability of the reservoir. Acidizing is achieved by pumping acid, predominantly hydrochloric acid, into the well to dissolve typically limestone, dolomite and calcite cement between the acid insoluble sediment grains of the reservoir rocks or to treat scale accumulation.

There are three major types of acid applications: matrix acidizing, fracture acidizing, and breakdown acidizing (pumped prior to a fracturing pad or cement operation in order to assist with formation breakdown (reduce fracture pressures, increased feed rates), as well as clean up left over cement in the well bore or perforations. A matrix acid treatment is performed when acid is pumped into the well and into the pores of the reservoir formation below the fracture pressure. In this form of acidization, the acids dissolve the sediments formation and/or mud solids that are inhibiting the permeability of the rock, enlarging the natural pores of the reservoir (wormholing) and stimulating the flow of hydrocarbons to the wellbore for recovery. While matrix acidizing is done at a low enough pressure to keep from fracturing the reservoir rock, fracture acidizing involves pumping acid into the well at a very high pressure, physically fracturing the reservoir rock and etching the permeability inhibitive sediments. This type of acid treatment forms channels or fractures through which the hydrocarbons can flow, in addition to forming a series of wormholes. In some instances, a proppant is introduced into the fluid which assists in propping open the fractures, further enhancing the flow of hydrocarbons into the wellbore.

There are many different mineral and organic acids used to perform an acid treatment on wells. The most common type of acid employed on wells to stimulate production is hydrochloric acid (HCl), which is useful in stimulating carbonate reservoirs.

Some of the major challenges faced in the oil & gas industry from using hydrochloric acid include the following: extremely high levels of corrosion (which is countered by the addition of 'filming' type corrosion inhibitors that are typically themselves toxic and harmful to humans, the environment and equipment) reactions between acids and various types of metals can vary greatly but softer metals, such as aluminum and magnesium, are very susceptible to major effects causing immediate damage. Hydrochloric acid produces hydrogen chloride gas which is toxic (potentially fatal) and corrosive to skin, eyes and metals. At levels above 50 ppm (parts per million) it can be Immediately Dangerous to Life and Health (1DHL). At levels from 1300-2000 ppm death can occur in 2-3 minutes.

The inherent environmental effects (organic sterility, poisoning of wildlife etc.) of acids in the event of an unintended or accidental release on surface or downhole into water aquifers or other sources of water are devastating and can cause significant pH reduction of such and can substantially increase the toxicity and could potentially cause a mass culling of aquatic species and potential poisoning of humans or livestock and wildlife exposed to/or drinking the water. An unintended release at surface can also cause hydrogen chloride gas to be released, potentially endangering human and animal health. This is a common event at large storage sites when tanks split or leak. Typically if near the public, large areas need to be evacuated post event and a comprehensive, expensive to implement, emergency evacuation plan needs to be in place prior to approval of such storage areas. Because of its acidic nature, hydrogen chloride gas is also corrosive, particularly in the presence of moisture.

The inability for mineral acids with common corrosion control additives and blends of such to biodegrade naturally results in expensive cleanup-reclamation costs for the operator should an unintended release occur. Moreover, the toxic fumes produced by mineral & some organic acids are harmful to humans/animals and are highly corrosive and/or produce potentially explosive vapours. Transportation and storage requirements for acids are restrictive and taxing. As well, the dangers surrounding exposure by personnel handling the blending of such dangerous products constrict their use/implementation in areas of high risk such as within city limits and environmentally sensitive areas such as offshore.

Another concern is the potential for exposure incidents on locations due to high corrosion levels, even at ambient temperatures, of acids causing potential storage tank failures and/or deployment equipment failures i.e. coiled tubing or high pressure iron failures caused by high corrosion high rates (pitting, cracks, pinholes and major failures). Other concerns include: downhole equipment failures from corrosion causing the operator to have to execute a work-over and replace down hole pumps, tubulars, cables, packers etc.; inconsistent strength or quality level of mineral & organic acids; potential supply issues based on industrial output levels; high levels of corrosion on surface pumping equipment resulting in expensive repair and maintenance levels for operators and service companies; the requirement of specialized equipment that is purpose built to pump acids greatly increasing the capital expenditures of operators and service companies; and the inability to source a finished product locally or very near its end use; transportation and onsite storage difficulties.

Typically, acids are produced in industrial areas of countries located some distance from oil & gas producing areas, up to 10 additives can also be required to control various aspects of the acids properties adding to complications in the handling and shipping logistics. Having an alternative that requires minimal additives is very advantageous.

Extremely high corrosion and reaction rates with temperature increase causes conventional acids to spend/react or "neutralize" prior to achieving the desired effect such as deeply penetrating an oil or gas formation to increase the wormhole or etched "pathway" effectively to allow the petroleum product to flow freely to the wellbore. As an example, hydrochloric acid can be utilized in an attempt to free stuck drill pipe in some situations. Prior to getting to the required depth to dissolve the formation that has caused the pipe/tubing to become stuck many acids spend or neutralize on formation closer to the surface due to increased bottom hole temperatures and greatly increased reaction rate, so it is advantageous to have an alternative that spends or reacts more methodically allowing the slough to be treated with a solution that is still active, allowing the pipe/tubing to be pulled free.

When used to treat scaling issues on surface equipment due to water mineral precipitation, conventional acids are exposed to human and mechanical devices as well as expensive equipment causing increased risk and cost for the operator. When mixed with bases or higher pH fluids, acids will create a large amount of thermal energy (exothermic reaction) causing potential safety concerns and equipment damage, acids typically need to be blended with fresh water (due to their intolerance of highly saline water, causing potential precipitation of minerals) to the desired concentration requiring companies to pre-blend off-site as opposed to blending on-site with sea or produced water thereby increasing costs associated with transportation.

Conventional mineral acids used in a pH control situation can cause rapid degradation of certain polymers/additives requiring increased loadings or chemicals to be added to counter these negative effects. Many offshore areas of operations have very strict regulatory rules regarding the transportation/handling and deployment of acids causing increased liability and costs for the operator. When using an acid to pickle tubing or pipe, very careful attention must be paid to the process due to high levels of corrosion, as temperatures increase, the typical additives used to control corrosion levels in acid systems begin to degrade very quickly (due to the inhibitors "plating out" on the steel or sheering out in high rate applications) causing the acids to become very corrosive and resulting in damage to downhole equipment/tubulars. Conventional acids can be harmful to many elastomers and/or seals found in the oil & gas industry such as those found in blow out preventers (BOP's)/downhole tools/packers/submersible pumps/seals etc. Having to deal with spent acid during the back flush process is also very expensive as these acids typically are still at a low pH and remain toxic and corrosive. It is advantageous to have an acid blend that can be exported to production facilities through pipelines that, once spent or applied, is much higher than that of spent HCl, reducing disposal costs/fees. Also mineral acids will typically precipitate iron and/or minerals solubilized during the operation as the pH of the spent acid increases causing facility upsets and lost production. It is advantageous to have a strong acid that will hold these solubilized minerals and metals in solution even as pH rises dramatically close to a neutral state, greatly reducing the need to dispose of spent acids and allowing them to be processed and treated in a more economical manner.

Acids are used in the performance of many operations in the oil & gas industry and are considered necessary to achieve the desired production of various petroleum wells and associated equipment, maintain their respective systems and aid in certain drilling operational functions (i.e. freeing stuck pipe, filter cake treatments). The associated dangers that come with using mineral acids are expansive and tasking to mitigate through controls whether they are chemically or mechanically engineered.

Eliminating or even simply reducing the negative effects of strong acids while maintaining their usefulness is a struggle and risk for the industry. As the public and government demand for the use of less hazardous products increases, companies are looking for alternatives that perform the required function without all or most of the drawbacks associated with the use of conventional acids.

Several operations in the oil industry expose fluids to very high temperatures (some up to and over 200° C./392° F.), the compositions used in these various operations need to withstand high temperatures without losing their overall effectiveness. These compositions must also be capable of being applied in operations over a wide range of temperatures while not or at least minimally affecting or corroding the equipment with which it comes in contact in comparison to a conventional mineral acid of which the corrosion effect at ultra-high temperatures is very difficult and expensive to control.

Offshore oil and gas operations are highly regulated due to the environmental concerns which arise from their operations and the potential for spills along with confined work spaces offering little chance of egress in the case of an incident. The complexity of drilling and completing offshore wells is always compounded by both safety issues (exposure to dangerous chemicals as an example) for workers on such offshore oil rigs and production platforms as well as environmental concerns.

Many countries bordering the waters where offshore drilling and production is routinely carried out have put into play a number of regulations and operational parameters aimed at minimizing the environmental and human exposure impact. These regulations/procedures include the ban and/or regulation of certain chemicals which may be harmful to marine life and/or the environment. In order to overcome these very restrictive regulations, many oil companies employ very costly containment programs for the handling of certain chemicals, such as acids, which have a wide array of uses in the industry of oil and gas exploration and production.

Many of the issues related with offshore oil and gas exploration and production stem from the fact that the conditions under which this is carried out are substantially different than those encountered in the same types of operations carried out onshore, including but not limited to confined spaces, lack of escape routes, very expensive down hole and surface safety and operational equipment compared to onshore requirements.

Acids conventionally used in various oil and gas operations can be exposed to temperatures of up to 200° C. At these temperatures, their reactivity and corrosive properties is exponentially increased and as such their economical effectiveness is greatly decreased. Corrosion is one of the major concerns at high temperatures and is difficult and expensive to control with additional chemistry, if it can be controlled at all. In many situations a mechanical procedure must be utilized as opposed to a chemical solution due to temperature constraints. Modified and synthetic acids developed and currently patented such as those containing main components of urea and hydrochloric acid are aimed at increasing personnel safety, reducing corrosion effects, slowing down the reaction rate and reducing the toxicity of HCl. However, it has been found that at temperatures above 90° C. the urea component in a synthetic or modified acid containing such compound tends to ultimately decompose and produce ammonia and carbon dioxide as a by-product of decomposition. The ammonia component will neutralize the acidic component or HCl and render the product non-reactive or neutral. Additionally there is the risk of wellbore and/or formation damage due to uncontrolled solubilized mineral precipitation due to the increase in pH caused predominantly by the formation of ammonia during the decomposition phase.

CA patent application 2,865,855 discloses compositions comprising hydrochloric acid at a concentration between 8 wt % and 28 wt % inclusive and at least one amino acid. The amino acid/hydrochloric acid molar ratio is between 0.2 and 1.5, and sufficient water is present to dissolve the hydrochloric acid and the amino acid. The amino acid may comprise alanine, asparagines, aspartic acid, cysteine, glutamic acid, histidine, leucine, lysine, methonine, proline, serine, threonine or valine or combinations thereof.

US patent application US 20140041690 A1 teaches the use of glycine in the making of a synthetic acid that is said to obviate all the drawbacks of strong acids such as hydrochloric acid. The new compound is made by dissolving glycine in water, in a weight ratio of approximately 1:1 to 1:1.5. The description states that the solution is mixed until the glycine is essentially fully dissolved in the water. Once dissolution is complete, hydrogen chloride gas is dissolved in the solution to produce the new compound, which is referred to as hydrogen glycine.

Despite the prior art and in light of the substantial problems elicited by the use of acids in oil and gas operations at high temperatures, there still exists a critical need to find an alternative to known synthetic or complexed/modified acids which will remain stable above temperatures of 90° C. while still providing the safety and lower corrosion effects of a modified acid while maintaining strength/performance of a hydrochloric acid. The inventors have surprisingly and unexpectedly found that by combining an amino acid with hydrochloric acid in appropriate ratios one can obtain both a safer alternative to HCl all the while maintaining the original performance properties of hydrochloric acid and its usefulness in oil and gas operations.

It was discovered that preferred compositions of the present invention exhibit stability for operations at elevated temperature (above 90° C. and, in some cases, up to 220° C.) and therefore makes them useful in the oil and gas industry for all applications where an acid is required and provides operators the ability to treat high and ultra-high temperature completions and maintenance/production operations with a technology that provides a level of safety, technical advantages and low corrosion unavailable in industry until now. Preferred compositions according to the present invention can ideally be used in various oilfield operations, including but not limited to: spearhead breakdown acid, acid fracturing operations, injection-disposal well treatments, high temperature cyclical steam injection (CSS) scale treatments, steam assisted gravity drainage (SAGD) scale treatments, surface and subsurface equipment and pipelines facilities, filter cake removal, tubing pickling, matrix acidizing operations, stimulations, fracturing, soaks, cement squeezes, fluid pH control, stuck pipe operations, and coiled tubing acid washes, soaks and squeezes.

Consequently, there is still a need for safer, more technically advanced strong acid compositions for use in the oil industry which can be used over this range of applications and temperatures which can decrease a number of the associated dangers and operational issues, such as high corrosion rates and wellbore damage caused by an explosive or extremely aggressive reaction rate at higher temperatures typically associated with conventional acids.

SUMMARY OF THE INVENTION

Compositions according to the present invention have been developed for the oil & gas industry and its associated applications, by targeting the problems of corrosion, logistics & handling, human & environmental exposure, reaction rates, toxicity levels, biodegradation tendencies and formation/fluid compatibilities and facility and/or production and water treatment infrastructure compatibilities.

It is an object of the present invention to provide an aqueous synthetic acid composition which can be used over a broad range of applications in the oil and gas industry and which exhibit advantageous properties over known compositions. According to an aspect of the invention, there is provided an aqueous synthetic acid composition for use in oil and gas activities, said composition comprising:

lysine & hydrogen chloride in a molar ratio ranging from 1:2.1 to 1:12.5; preferably, the aqueous synthetic acid composition comprises lysine and hydrogen chloride in a molar ratio ranging from 1:3 to 1:12.5; preferably in a molar ratio ranging from 1:3.5 to 1:9, more preferably in a molar ratio ranging from 1:4.5 to 1:8.5, even more preferably in a molar ratio ranging from more than 1:5 to 1:6.5.

According to a preferred embodiment of the present invention, there is provided an aqueous synthetic acid composition which, upon proper use, results in a very low corrosion rate on oil and gas industry tubulars and equipment.

According to a preferred embodiment of the present invention, there is provided an aqueous synthetic acid composition for use in the oil industry which is biodegradable. According to another preferred embodiment of the present invention, there is provided an aqueous synthetic acid composition for use in the oil industry which has a controlled, more methodical spending (reacting) nature that is near linear as temperature increases, low-fuming/vapor pressure, low-toxicity, and has a highly controlled manufacturing process ensuring consistent end product strength and quality.

According to another preferred embodiment of the present invention, there is provided an aqueous synthetic acid composition for use in the oil industry which has a pH below 1. According to another preferred embodiment of the present invention, there is provided an aqueous synthetic acid composition for use in the oil industry which will keep iron particles and 20 solubilized carbonate in solution even as the pH rises to a level >4 pH.

According to another preferred embodiment of the present invention, there is provided an aqueous synthetic acid composition for use in the oil industry which will provide a thermal stability at temperatures above 100° C.

According to another preferred embodiment of the present invention, there is provided a synthetic acid composition for use in the oil industry which will provide corrosion protection at an acceptable oilfield limit when said composition is in contact with metal components and is at temperatures ranging from 100° C. to 220° C.

According to a preferred embodiment of the present invention, there is provided a synthetic acid composition for use in the oil industry which has minimal exothermic reactivity upon dilution or during the reaction process.

Preferably, the aqueous synthetic acid composition for use in the oil industry is compatible with existing industry acid additives.

According to another preferred embodiment of the present invention, there is provided an aqueous synthetic acid composition for use in the oil industry which has higher salinity tolerance. A tolerance for high salinity fluids, or brines, is desirable for onshore and offshore acid applications. Conventional acids are normally blended with fresh water and additives, typically far offsite, and then transported to the area of treatment as a finished blend. It is advantageous to have an alternative that can be transported as a concentrate safely to the treatment area, then blended with a saline produced water or sea water greatly reducing the logistics requirement. A conventional acid system can precipitate salts/minerals heavily if blended with fluids of an excessive saline level resulting in formation plugging or ancillary damage, inhibiting production and substantially increasing costs. Brines are also typically present in formations, thus having an acid system that has a high tolerance for brines greatly reduces the potential for formation damage or emulsions forming down-hole during or after product placement/spending (reaction) occurs.

According to another aspect of the present invention, there is provided an aqueous synthetic acid composition for use in the oil industry which is immediately reactive upon contact/application.

According to another aspect of the present invention, there is provided an aqueous synthetic acid composition for use in the oil industry which results in less unintended near wellbore erosion or face dissolution due to a more controlled reaction rate. This, in turn, results in deeper formation penetration, increased permeability, and reduces the potential for zonal communication during a typical 'open hole' mechanical isolation application treatment. As a highly reactive acid, such as hydrochloric acid, is deployed into a well that has open hole packers for isolation (without casing) there is a potential to cause a loss of near-wellbore compressive strength resulting in communication between zones or sections of interest as well as potential sand production, and fines migration. It is advantageous to have an alternative that will react with a much more controlled rate or speed, thus greatly reducing the potential for zonal communication and the above potential negative side effects of traditional acid systems.

According to a preferred embodiment of the present invention, there is provided an aqueous synthetic acid composition for use in the oil industry which provides a controlled and comprehensive reaction rate throughout a broad range of temperatures up to 220° C.

According to another preferred embodiment of the present invention, there is provided a use of an aqueous synthetic acid composition comprising lysine and hydrogen chloride in a molar ratio ranging from 1:3.5 to 1:12.5 for injection into a oil or gas well to perform a treatment with said composition; recovering the spent acid from the well; and sending the spent acid to a plant.

Accordingly, a composition according to a preferred embodiment of the present invention can overcome many of the drawbacks found in the use of compositions of the prior art related to the oil & gas industry.

According to a preferred embodiment of the present invention, there is provided a method of matrix acidizing a hydrocarbon-containing dolomite formation, said method comprising:

providing a composition comprising a HCl and lysine mixture and water; wherein the molar ratio between the HCl and the lysine ranges from 4.5:1 to 8.5:1, injecting said composition downhole into said formation at a pressure below the fracking pressure of the formation; and allowing a sufficient period of time for the composition to contact said formation to create wormholes in said formation.

According to a preferred embodiment of the present invention, there is provided a method of matrix acidizing a hydrocarbon-containing chalk formation, said method comprising:

providing a composition comprising a HCl and lysine mixture and water; wherein the molar ratio between the HCl and the lysine ranges from 4.5:1 to 8.5:1, injecting said composition downhole into said formation at a pressure below the fracking pressure of the formation; and allowing a sufficient period of time for the composition to contact said formation to create wormholes in said formation.

According to a preferred embodiment of the present invention, there is provided a method of matrix acidizing a hydrocarbon-containing limestone formation, said method comprising:

providing a composition comprising a HCl and lysine mixture and water; wherein the molar ratio between the HCl and the lysine ranges from 4.5:1 to 8.5:1, injecting said composition downhole into said formation at a pressure below the fracking pressure of the formation; and allowing a sufficient period of time for the composition to contact said formation to create wormholes in said formation.

According to a preferred embodiment of the present invention, there is provided a method of creating wormholes in a hydrocarbon-containing formation, said method comprising:

providing a composition comprising a HCl and lysine mixture and water; wherein the molar ratio between the HCl and the lysine ranges from 4.5:1 and 8.5:1, injecting said composition downhole at a desired injection rate into said formation at a pressure below the fracking pressure of the formation; and allowing a sufficient period of time for the composition to contact said formation to create wormholes in said formation;

wherein said injection rate is below the injection rate used with a conventional mineral acid.

Preferably, the desired injection rate used is determined by testing said composition at various injection rate into a core sample of said formation; collecting the pore volume to breakthrough data obtained from said testing; plotting a graph of the pore volume to breakthrough data against the injection rate; and determining the optimal injection rate as the lowest point on the plot.

According to another aspect of the present invention, there is provided a use of an aqueous synthetic acid composition in the oil industry to perform an activity selected from the group consisting of: stimulate formations; assist in reducing breakdown pressures during downhole pumping operations; treat wellbore filter cake post drilling operations; assist in freeing stuck pipe; descale pipelines and/or production wells; increase injectivity of injection wells; lower the pH of a fluid; remove undesirable scale on a surface selected from the group consisting of: equipment, wells and related equipment and facilities; fracture wells; complete matrix stimulations; conduct annular and bullhead squeezes & soaks; pickle tubing, pipe and/or coiled tubing; increase effective permeability of formations; reduce or remove wellbore damage; clean perforations; and solubilize limestone, dolomite, calcite and combinations thereof; said composition comprising lysine and HCl in a molar ratio ranging from 1:2.1 to 1:12.5. Preferably, the composition comprises lysine and HCl in a molar ratio ranging from 1:4.5 to 1:8.5.

BRIEF DESCRIPTION OF THE FIGURES

The invention may be more completely understood in consideration of the following description of various embodiments of the invention in connection with the accompanying figure, in which.

DETAILED DESCRIPTION OF THE PREFERRED EMBODIMENTS

Figure 1:
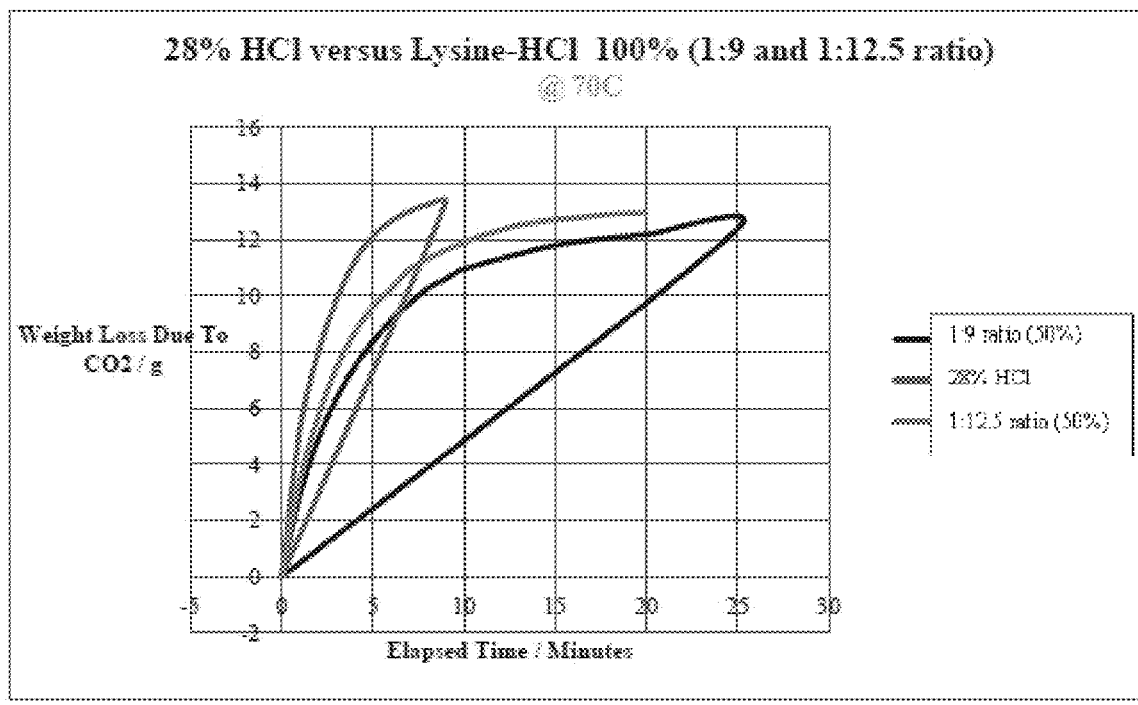
FIG. 1 is a graphical representation of the dissolution of CaCO3 over time at 70° C. by a control and two compositions according to preferred embodiment of the present invention.

The description that follows, and the embodiments described therein, is provided by way of illustration of an example, or examples, of particular embodiments of the principles of the present invention. These examples are provided for the purposes of explanation, and not limitation, of those principles and of the invention.

Lysine-HCl is the main component in terms of volume and weight percent of the composition of the present invention, and as an amino acid it contains at least one amino group, —NH2, and one carboxyl group, —COOH. When added to hydrochloric acid a Lewis acid/base adduct is formed where the primary amino group acts as a Lewis base and the proton of the HCl as Lewis acid. The formed adduct greatly reduces the hazardous effects of the hydrochloric acid on its own, such as the fuming effect, the hygroscopicity, and the highly corrosive nature The excess nitrogen can also act as a corrosion inhibitor at higher temperatures. Lysine & hydrogen chloride are present in a molar ratio ranging from 1:3 to 1:12.5; preferably in a molar ratio ranging from 1:4.5 to 1:9, and more preferably in a molar ratio ranging from more than 1:5 to 1:8.5. The lysine-HCl ratio can be adjusted or determined depending on the intended application and the desired solubilizing ability. By increasing the ratio of the HCl component, the solubilizing ability will increase while still providing certain health, safety, environmental and operational advantages over hydrochloric acid.

It is preferable to add the lysine at a molar ratio less than 1:1 to the moles of HCl acid (or any acid). Tests have shown than even adding lysine to HCl in a molar ratio of around 1:2 would neutralize the hydrochloric acid to the point of almost completely removing all of its acidic character. Preferably, the composition according to the present invention comprises at most 1 mole of lysine per 3.0 moles of HCl. The lysine-hydrochloride also allows for a reduced rate of reaction when in the presence of carbonate-based materials. This again is due to the stronger molecular bonds associated over what hydrochloric acid traditionally displays. Further, since the composition according to the present invention is mainly comprised of lysine (which is naturally biodegradable), the product testing has shown that the lysine hydrochloride will maintain the same biodegradability function, something that hydrochloric acid will not on its own.

Alcohols and derivatives thereof, such as alkyne alcohols and derivatives and preferably propargyl alcohol and derivatives thereof can be used as corrosion inhibitors. Propargyl alcohol itself is traditionally used as a corrosion inhibitor which works well at low concentrations. It is however a very toxic/flammable chemical to handle as a concentrate, so care must be taken when exposed to the concentrate. In the composition according to the present invention, it is preferred to use 2-Propyn-1-ol, complexed with methyloxirane, as this is a much safer derivative to handle. Basocorr® is an example of such a compound.

Metal iodides or iodates such as potassium iodide, sodium iodide, cuprous iodide and lithium iodide can potentially be used as corrosion inhibitor intensifier. In fact, potassium iodide is a metal iodide traditionally used as corrosion inhibitor intensifier, however it is expensive, but works extremely well. It is non-regulated and safe to handle. The iodide or iodate is preferably present in a weight percentage ranging from 0.1 to 5 wt %, more preferably from 0.2 to 3 wt %, yet even more preferably from 0.25 to 2 wt %.

The use of formic acid as corrosion inhibitor has been known for decades. However, the high concentrations in which its use has been reported along with the compounds it has been intermixed with have not made it a desirable compound in many applications. Prior art compositions containing formic acid require the presence of quinoline containing compounds or derivatives thereof, which render their use, in an increasingly environmentally conscious world, quite restricted. In the present invention, formic acid or a derivative thereof such as formic acid, acetic acid, ethylformate and butyl formate can be present in an amount ranging from 0.05-2.0 wt %, preferably in an amount of approximately 0.15 wt % when such compound is present, formic acid is the preferred compound.

Example 1

Lysine mono-hydrochloride is used as starting reagent. To obtain a 1:2.1 molar ratio of lysine to HCl, 370 ml of a 50 wt % lysine-HCl (also referred to as L50) solution and 100 ml HCl aq. 36% (22 Baume) are combined. In the event that additives are used, they are added after thorough mixing. For example, propargyl alcohol, and potassium iodide can be added at this point. Circulation is maintained until all products have been solubilized. Additional components can now be added as required. The process to obtain other compositions according to the present invention is similar where the only difference lies in the amount of HCl added.

The resulting composition of Example 1 is an amber colored liquid with a fermentation like odour having shelf-life of greater than 1 year. It has a freezing point temperature of approximately minus 30° C. and a boiling point temperature of approximately 100° C. It has a specific gravity of 1.15±0.02. It is completely soluble in water and its pH is less than 1.

The composition is biodegradable and is classified as a mild irritant according to the classifications for skin tests. The composition is substantially low fuming. Toxicity testing was calculated using surrogate information and the LD50 was determined to be greater than 2000 mg/kg.

Example 2

A composition according to a preferred embodiment of the present invention was prepared to yield a lysine:HCl composition in a ratio of 1:4.5. This composition is obtained through the following mixing ratio: 370 ml of L50 solution+ 300 ml 22Baume HCl; which leads to the following ratio: 1 mol Lysine monohydrochloride to 4.5 mol HCl.

The composition of Example 2 has an amber liquid appearance. Its salinity is 48%. Its freezing point is minus 45° C. and boiling point above 100° C. Its pH is below 1.0. The composition of Example 2 was also tested for skin corrosiveness and deemed non-corrosive to the skin. Oral toxicity was calculated using the LD50 rat model and deemed to be of low oral toxicity. It is considered readily biodegradable and offers a lower bioaccumulative potential when compared to 15% HCl.

Example 3

A composition according to a preferred embodiment of the present invention was prepared following the same procedure as found in Example 1 to yield a lysine:HCl composition in a ratio of 1:6.5. With respect to the corrosion impact of the composition on typical oilfield grade steel, it was established that compositions according to Examples 1, 2 and 3 were clearly well below the acceptable corrosion limits set by industry for certain applications, such as spearhead applications or lower temperature scaling.

In preferred embodiments of the present invention, 2-Propyn-1-ol, complexed with methyloxirane can be present in a range of 0.05-5.0 wt %, preferably it is present in an amount ranging from 0.1 to 3 wt %, even more preferably from 0.5 to 2.0% and yet even more preferably from 0.75 to 1.5 wt %. As a substitute for potassium iodide one could use sodium iodide, copper iodide and lithium iodide. However, potassium iodide is the most preferred. Formic acid can be present in a range of 0.05-2.0%, preferably it is present in an amount of approximately 0.15%. As a substitute for formic acid one could use acetic acid. However, formic acid is most preferred.

Corrosion Testing

Compositions according to preferred embodiments of the present invention were exposed to corrosion testing. The results of the corrosion tests are reported in Tables 1 through 10. The controls used were compositions of urea-HCl and urea-HCl with additives. Coupons of N80 and J55 grade steel were exposed to the various listed compositions for a period of 6 hours at varying temperatures.

TABLE 1

Corrosion testing comparison between Lysine-HC1 using various additives - Run time 6 hours on N-80 steel coupons at 90° C. having a surface area of 28.0774 cm2

| Fluid | Additives | Initial wt (g) | Final wt (g) | Wt loss (g) | Mils/yr | Mm/year | lb/ft2 |
|---|---|---|---|---|---|---|---|
| HC1-Urea (control) | | 49.916 | 49.7989 | 0.117 | 304.9971 | 7.747 | 0.009 |
| HC1-Urea + Seawater | | 49.6828 | 49.313 | 0.370 | 963.1762 | 24.465 | 0.027 |
| Urea-HC1 | 1.0% CI-4A 0.4% CI-2 0.1% FA 0.25% CI-1A 0.2% NIS | 46.8766 | 46.7886 | 0.088 | 229.2036 | 5.822 | 0.006 |
| Lysine-HC1 1:2 + 50% Seawater | 0.3% CI-4A 0.4% CI-2 0.1% FA 0.25% CI-1A 0.2% NIS | 48.713 | 46.6944 | 2.019 | 5257.619 | 133.544 | 0.147 |
| Lysine-HC1 1:2 + 50% Seawater | 0.3% CI-4A 0.4% CI-2 0.1% FA 0.25% CI-1A 0.2% NIS | 48.1662 | 46.6923 | 1.474 | 3838.9 | 97.508 | 0.108 |
| Lysine-HC1 1:3 + 50% Seawater | 0.3% CI-4A 0.4% CI-2 0.1% FA 0.25% CI-1A 0.2% NIS | 48.4238 | 48.2938 | 0.130 | 338.5963 | 8.600 | 0.009 |
| Lysine-HC1 1:3 + 50% Seawater | 0.3% CI-4A 0.4% CI-2 0.1% FA 0.25% CI-1A 0.2% NIS | 49.9128 | 49.7349 | 0.178 | 463.356 | 11.769 | 0.013 |
| Lysine-HC1 1:3.5 + 50% Seawater | 0.3% CI-4A 0.4% CI-2 0.1% FA 0.25% CI-1A 0.2% NIS | 48.9523 | 48.8292 | 0.123 | 320.6246 | 8.144 | 0.009 |
| Lysine-HC1 1:4 + 50% Seawater | 0.3% CI-4A 0.4% CI-2 0.1% FA 0.25% CI-1A 0.2% NIS | 49.0231 | 48.9082 | 0.115 | 299.267 | 7.601 | 0.008 |

TABLE 1-continued

Corrosion testing comparison between Lysine-HC1 using various additives - Run time 6 hours on N-80 steel coupons at 90° C. having a surface area of 28.0774 cm2

| Fluid | Additives | Initial wt (g) | Final wt (g) | Wt loss (g) | Mils/yr | Mm/year | lb/ft2 |
|---|---|---|---|---|---|---|---|
| Lysine-HC1 1:5 + 50% Seawater | 0.3% CI-4A 0.4% CI-2 0.1% FA 0.25% CI-1A 0.2% NIS | 49.9415 | 49.7828 | 0.159 | 413.3479 | 10.499 | 0.012 |

Note:
CI-4A refers to Basocorr PP; CI-2 is an ethoxylate-based film forming surfactant CI; FA refers to Formic Acid; CI-1A refers to potassium iodide; NIS refers to a non-ionic surfactant.
Note also the impact of the use of seawater in the control compositions.

TABLE 2

Corrosion testing on N-80 steel coupons having a surface area of 28.0774 cm2 at 90° C. for a period of 6 hours

| Fluid | Additives | Initial wt (g) | Final wt (g) | Wt loss (g) | Mils/yr | Mm/year | lb/ft2 |
|---|---|---|---|---|---|---|---|
| Lysine-HC1 1:6 + 50% Seawater | 1.0% CI-4A 0.4% CI-2 0.1% FA 0.25% CI-1A 0.2% NIS | 50.2511 | 50.0832 | 0.168 | 437.3101 | 11.108 | 0.012 |
| Lysine-HC1 1:7 + 50% Seawater | 1.0% CI-4A 0.4% CI-2 0.1% FA 0.25% CI-1A 0.2% NIS | 47.1876 | 46.9962 | 0.191 | 498.5179 | 12.662 | 0.014 |

TABLE 3

Corrosion testing on N-80 steel coupons having a surface area of 28.0774 cm2 at 130° C. for a period of 6 hours

| Fluid | Additives | Initial wt (g) | Final wt (g) | Wt loss (g) | Mils/yr | Mm/year | lb/ft2 |
|---|---|---|---|---|---|---|---|
| Lysine-HC1 1:3.5 + 50% Seawater | 1.0% CI-4A 0.4% CI-2 0.1% FA 0.25% CI-1A 0.2% NIS | 50.2188 | 43.513 | 6.706 | 17465.84 | 443.632 | 0.490 |
| Lysine-HC1 1:3.5 + 50% Seawater | 1.0% CI-4A 0.4% CI-2 0.1% FA 0.25% CI-1A 0.2% NIS | 47.9322 | 47.6114 | 0.321 | 835.5514 | 21.223 | 0.023 |

TABLE 4

Corrosion testing on refurbished N-80 steel coupons having a surface area of 28.0774 cm2 at 90° C. for a period of 6 hours

| Fluid | Additives | Initial wt (g) | Final wt (g) | Wt loss (g) | Mils/yr | Mm/year | lb/ft2 |
|---|---|---|---|---|---|---|---|
| Lysine-HC1 1:3.5 + 50% Seawater | 2% CI-4A 1% CI-1A | 47.5778 | 47.5611 | 0.017 | 43.4966 | 1.105 | 0.001 |
| Lysine-HC1 1:3.5 + 50% Seawater | 2% CI-4A 1% FA | 48.0529 | 48.0289 | 0.024 | 62.51008 | 1.588 | 0.002 |

TABLE 4-continued

Corrosion testing on refurbished N-80 steel coupons having a surface area of 28.0774 cm2 at 90° C. for a period of 6 hours

| Fluid | Additives | Initial wt (g) | Final wt (g) | Wt loss (g) | Mils/yr | Mm/year | lb/ft2 |
|---|---|---|---|---|---|---|---|
| Lysine-HC1 1:3.5 + 50% Seawater | 2% CI-4A 1% CI-1A 1% FA | 44.819 | 44.7978 | 0.021 | 55.21724 | 1.403 | 0.002 |

TABLE 5

Corrosion testing on refurbished N-80 steel coupons having a density of 7.86 g/ml and a surface area of 28.0774 cm2 at 130° C. for a period of 6 hours

| Fluid | Additives | Initial wt (g) | Final wt (g) | Wt loss (g) | Mils/yr | Mm/year | lb/ft2 | Note |
|---|---|---|---|---|---|---|---|---|
| Lysine-HC1 1:3.5 + 50% Seawater | 2% CI-4A 1% CI-1A | 48.485 | 47.8807 | 0.604 | 1573.9518 | 39.978 | 0.044 | 1 |
| Lysine-HC1 1:3.5 + 50% Seawater | 2.5% CI-4A 1% CI-1A | 52.1508 | 51.7599 | 0.391 | 1018.133 | 25.861 | 0.028 | 1 |
| Lysine-HC1 1:3.5 + 50% Seawater | 2.5% CI-4A 1% CI-1A 1% FA | 50.2415 | 49.8461 | 0.395 | 1029.8536 | 26.158 | 0.028 | 1 |
| Lysine-HC1 1:4 + 50% Seawater | 2.5% CI-4A 1% CI-1A 1% FA | 48.0069 | 47.7398 | 0.267 | 695.68513 | 17.670 | 0.019 | 2 |
| Lysine-HC1 1:5 + 50% Seawater | 2.5% CI-4A 1% CI-1A 1% FA | 47.456 | 46.2342 | 1.222 | 3182.2842 | 80.830 | 0.089 | 3 |
| Lysine-HCI 1:4 + 50% Seawater | 2.5% CI-4A 1% CI-1A | 47.3366 | 47.1584 | 0.178 | 464.13737 | 11.789 | 0.013 | 3 |
| Lysine-HC1 1:3.5 + 50% Seawater | 2.0% CI-4A 0.5% CI-1A | 44.3151 | 44.0538 | 0.261 | 680.57853 | 17.287 | 0.019 | 1 |
| Lysine HCl 1:4 + 50% Seawater | 2.0% CI-4A 0.5% CI-1A | 47.6843 | 47.4897 | 0.195 | 506.85259 | 12.874 | 0.014 | 1 |

Note:
1: Few deep pitting
2: Two deep pitting
3: Two pitting

TABLE 6

Corrosion testing on refurbished J-55 steel coupons having a density of 7.86 g/ml and a surface area of 28.922 cm2 at 90° C. for a period of 6 hours

| Fluid | Additives | Initial wt (g) | Final wt (g) | Wt loss (g) | Mils/yr | Mm/year | lb/ft2 |
|---|---|---|---|---|---|---|---|
| HC1-Urea + Seawater | 3.0% CI-4A 0.4% CI-2 0.1% FA 0.25% CI-1A 0.2% NIS | 35.2002 | 35.0522 | 0.148 | 374.22183 | 9.505 | 0.010 |
| Lysine HCl 1:2 + 50% Seawater | 3.0% CI-4A 0.4% CI-2 0.1% FA 0.25% CI-1A 0.2% NIS | 35.8483 | 35.604 | 0.244 | 617.71887 | 15.690 | 0.018 |
| Lysine HCl 1:3 + 50% Seawater | 3.0% CI-4A 0.4% CI-2 0.1% FA 0.25% CI-1A 0.2% NIS | 35.8132 | 35.7047 | 0.108 | 274.34506 | 6.968 | 0.008 |
| Lysine HCl 1:4 + 50%Seawater | 3.0% CI-4A 0.4% CI-2 0.1% FA 0.25% CI-1A 0.2% NIS | 35.8368 | 35.7063 | 0.130 | 329.97263 | 8.381 | 0.009 |
| Lysine HCl 1:5 + 50% Seawater | 3.0% CI-4A 0.4% CI-2 0.1% FA | 33.3433 | 33.2151 | 0.128 | 330.03551 | 8.383 | 0.009 |

TABLE 6-continued

Corrosion testing on refurbished J-55 steel coupons having a density of 7.86 g/ml and a surface area of 28.922 cm2 at 90° C. for a period of 6 hours

| Fluid | Additives | Initial wt (g) | Final wt (g) | Wt loss (g) | Mils/yr | Mm/year | lb/ft2 |
|---|---|---|---|---|---|---|---|
| Lysine HCl 1:6 + 50% Seawater | 0.25% CI-1A 0.2% NIS 3.0% CI-4A 0.4% CI-2 0.1% FA | 35.8887 | 35.7469 | 0.142 | 358.54497 | 9.107 | 0.010 |
| Lysine HCl 1:7 + 50% Seawater | 0.25% CI-1A 0.2% NIS 3.0% CI-4A 0.4% CI-2 0.1% FA | 33.2402 | 33.082 | 0.158 | 400.01279 | 10.160 | 0.011 |
| Lysine HCl 1:3.5 + 50%S eawater | 0.25% CI-1A 0.2% NIS 3.0% CI-4A 0.4% CI-2 0.1% FA | 48.825 | 48.7205 | 0.105 | 272.1793 | 6.913 | 0.008 |
| Lysine HCl 1:3.5 + 50% Seawater | 0.25% CI-1A 0.2% NIS 3.0% CI-4A 0.4% CI-2 0.1% FA | 49.725 | 49.6599 | 0.065 | 169.5586 | 4.307 | 0.005 |
| Lysine HCl 1:2 + 50% Seawater | 0.25% CI-1A 0.2% NIS 3.0% CI-4A 0.4% CI-2 0.1% FA | 35.8483 | 35.604 | 0.244 | 617.7189 | 15.690 | 0.017 |
| Lysine HCl 1:3 + 50% Seawater | 0.25% CI-1A 0.2% NIS 3.0% CI-4A 0.4% CI-2 0.1% FA | 35.8132 | 35.7047 | 0.108 | 274.3451 | 6.968 | 0.008 |
| Lysine HCl 1:4 + 50% Seawater | 0.25% CI-1A 0.2% NIS 3.0% CI-4A 0.4% CI-2 0.1% FA | 35.8368 | 35.7063 | 0.130 | 329.9726 | 8.381 | 0.009 |
| Lysine HCl 1:5 + 50% Seawater | 0.25% CI-1A 0.2% NIS 3.0% CI-4A 0.4% CI-2 0.1% FA | 33.3433 | 33.2151 | 0.128 | 330.0355 | 8.383 | 0.009 |
| Lysine HCl 1:6 + 50% Seawater | 0.25% CI-1A 0.2% NIS 3.0%CI-4A 0.4% CI-2 0.1% FA | 35.8887 | 35.7469 | 0.142 | 358.545 | 9.107 | 0.010 |
| Lysine HCl 1:7 + 50% Seawater | 0.25% CI-1A 0.2% NIS 3.0% CI-4A 0.4% CI-2 0.1% FA | 33.2402 | 33.082 | 0.158 | 400.0128 | 10.160 | 0.011 |

TABLE 7

Corrosion testing on refurbished N-80 steel coupons having a density of 7.86 g/ml and a surface area of 28.0774 cm2 at 110° C. for a period of 6 hours

| Fluid | Additives | Initial wt (g) | Final wt (g) | Wt loss (g) | Mils/yr | Mm/year | lb/ft2 | Note |
|---|---|---|---|---|---|---|---|---|
| 28% HCl + Seawater | 0.3% CI-4A 0.4% CI-2 0.25% CI-1A | 48.8797 | 48.737 | 0.143 | 371.67454 | 9.441 | 0.010 | 1 |
| Lysine HCl 1:9 + 50% Seawater | 1% CI-4A 1% CI-1A | 49.5149 | 48.8421 | 0.673 | 1752.366 | 44.510 | 0.049 | 2 |
| Lysine HCl 1:9 + 50% Seawater | 1% CI-2 1% CI-1A | 45.1327 | 44.9849 | 0.148 | 384.95793 | 9.778 | 0.011 | 1 |
| Lysine HCl 1:9 + 50% Seawater | 1% CI-4A 1% CI-2 1% CI-1A | 48.2265 | 48.1564 | 0.070 | 182.58153 | 4.638 | 0.005 | 1 |

TABLE 7-continued

Corrosion testing on refurbished N-80 steel coupons having a density of 7.86 g/ml and a surface area of 28.0774 cm2 at 110° C. for a period of 6 hours

| Fluid | Additives | Initial wt (g) | Final wt (g) | Wt loss (g) | Mils/yr | Mm/year | lb/ft2 | Note |
|---|---|---|---|---|---|---|---|---|
| Lysine HCl 1:9 + 50% Seawater | 1% CI-4A 0.5 CI-2 1% CI-1A | 49.5845 | 49.5103 | 0.074 | 193.26034 | 4.909 | 0.005 | 1 |
| Lysine HCl 1:9 + 50% Seawater | 1% CI-4A 0.25% CI-2 1% CI-1A | 49.1063 | 49.053 | 0.053 | 138.82448 | 3.526 | 0.004 | 1 |
| Lysine HCl 1:9 + 50% Seawater | 0.5% CI-4A 1% CI-2 1% CI-1A | 44.8107 | 44.7499 | 0.061 | 158.35888 | 4.022 | 0.004 | 1 |
| Lysine HCl 1:9 + 50% Seawater | 0.5% CI-4A 0.5% CI-2 1% CI-1A | 47.9499 | 47.8846 | 0.065 | 170.07952 | 4.320 | 0.005 | 1 |
| Lysine HCl 1:9 + 50% Seawater | 0.3% CI-4A 0.4% CI-2 0.25% CI-1A | 49.3101 | 49.2194 | 0.091 | 236.23602 | 6.000 | 0.007 | 1 |
| Lysine HCl 1:9 + 50% Seawater | 0.3% CI-4A 0.4% CI-2 0.25% CI-1A | 51.3474 | 51.1809 | 0.166 | 433.6637 | 11.015 | 0.012 | 1 |
| Lysine HCl 1:9 + 50% Seawater | 0.3% CI-4A 0.4% CI-2 0.25% CI-1A | 39.4476 | 39.3251 | 0.123 | 261.10254 | 6.632 | 0.007 | 1 |
| Lysine HCl 1:9 + 50% Seawater | 0.3% CI-4A 0.4% CI-2 | 48.2935 | 48.0981 | 0.195 | 508.93626 | 12.927 | 0.014 | 1 |

1: slightly foamy coupon was greasy
2: some pitting

TABLE 8

Corrosion testing on refurbished N-80 steel coupons having a density of 7.86 g/ml and a surface area of 28.0774 cm2 at 130° C. for a period of 6 hours

| Fluid | Additives | Initial wt (g) | Final wt (g) | Wt loss (g) | Mils/yr | Mm/year | lb/ft2 | Note |
|---|---|---|---|---|---|---|---|---|
| Lysine HCl 1:9 + 50% Seawater | 0.3% CI-4A 0.4% CI-2 0.25% CI-1A | 49.4458 | 49.0756 | 0.370 | 964.21803 | 24.491 | 0.027 | 1 |
| Lysine -HCl 1:9 + 50% Seawater | 0.3% CI-4A 0.4% CI-2 1% CI-1A | 49.8823 | 49.5507 | 0.332 | 863.68098 | 21.937 | 0.024 | 1 |
| Lysine -HCl 1:9 + 50% Seawater | 0.5% CI-4A 0.6% CI-2 0.25% CI-1A | 49.2333 | 48.9962 | 0.237 | 617.54753 | 15.686 | 0.017 | 1 |
| Lysine -HCl 1:9 + 50% Seawater | 0.5% CI-4A 0.6% CI-2 1% CI-1A | 48.5541 | 48.3619 | 0.192 | 500.60158 | 12.715 | 0.014 | 1 |
| Lysine HCl- 1:4 + 50% Seawater | 2.5% CI-4A 1% CI-1A | 48.768 | 48.7169 | 0.051 | 133.09439 | 3.381 | 0.004 | 2 |
| Lysine HCl- 1:4 + 50% Seawater | 2.5% CI-4A 0.75% CI-1A | 44.5581 | 44.5007 | 0.057 | 149.50328 | 3.797 | 0.004 | 2 |
| Lysine- HCl 1:4 + 50% Seawater | 2.5% CI-4A 0.75% CI-1A | 48.8124 | 48.7654 | 0.047 | 122.41558 | 3.109 | 0.003 | 4 |
| Lysine HCl- 1:4 + 50% Seawater | 2.5% CI-4A 0.75% CI-1A | 48.2122 | 48.0772 | 0.135 | 351.61922 | 8.931 | 0.010 | 5 |
| Lysine HCl- 1:4 + 50% Seawater | 3% CI-4A 0.75% CI-1A | 48.6493 | 48.538 | 0.111 | 289.89051 | 7.363 | 0.008 | 3 |
| Lysine -HCl 1:9 + 50% Seawater | 0.5% CI-4A 0.6% CI-2 1% CI-1A | 50.4895 | 50.0184 | 0.471 | 1227.0208 | 31.166 | 0.034 | 3 |
| Lysine HCl- 1:4 + 50% Seawater | 3% CI-4A 0.75% CI-1A | 50.9392 | 50.8362 | 0.103 | 268.27244 | 6.814 | 0.008 | 8 |
| Lysine- HCl 1:4 + 50% Seawater | 3.5% CI-4A 0.75% CI-1A | 51.2116 | 51.1125 | 0.099 | 258.11455 | 6.556 | 0.007 | 8 |
| Lysine HCl- 1:4 + 50% Seawater | 3% CI-4A 0.5% CI-1A | 50.7036 | 50.5856 | 0.118 | 307.34124 | 7.806 | 0.009 | 9 |

TABLE 8-continued

Corrosion testing on refurbished N-80 steel coupons having a density of 7.86 g/ml and a surface area of 28.0774 cm2 at 130° C. for a period of 6 hours

| Fluid | Additives | Initial wt (g) | Final wt (g) | Wt loss (g) | Mils/yr | Mm/year | lb/ft2 | Note |
|---|---|---|---|---|---|---|---|---|
| Lysine- HCl 1:4 + 50% Seawater | 3.5% CI-4A 0.5% CI-1A | 50.5911 | 50.4468 | 0.144 | 375.84188 | 9.546 | 0.011 | 7 |

Note:
1: slightly foamy coupon was greasy
2: One pit long side, coupon stands
3: No pit
4: two pits long side
5: several pits long side
6: some pitting
7: one medium pit
8: more than one medium pit
9: many deep pits

TABLE 9

Corrosion testing on J-55 steel coupons having a density of 7.86 g/ml and a surface area of 28.922 cm2 at 70° C. for a period of 6 hours

| Fluid | Additives | Initial wt (g) | Final wt (g) | Wt loss (g) | Mils/yr | Mm/year | lb/ft2 |
|---|---|---|---|---|---|---|---|
| Lysine-HCl 1:4 | None | 33.2827 | 30.8391 | 2.444 | 6178.7058 | 156.939 | 0.173 |
| Lysine-HCl 1:4 + 50% Distilled water | None | 35.0081 | 34.4093 | 0.599 | 1514.0813 | 38.458 | 0.042 |
| 15% HCl | None | 36.7962 | 34.6209 | 2.175 | 5500.3023 | 139.708 | 0.154 |
| 7.5% HCl | None | 36.8248 | 35.4207 | 1.404 | 3550.3032 | 90.178 | 0.100 |

Corrosion Testing on QT-800 Steel

Corrosion testing was carried out using a composition according to a preferred embodiment of the present invention at a temperature of 130° C. with a QT-800 steel surface area of 34.31 cm2 and a steel density of 7.86 g/ml. The results of this corrosion testing series are reported in Table 10 below.

TABLE 10

Corrosion testing on QT-800 steel coupons having a density of 7.86 g/ml and a surface area of 28.922 cm2 at 130° C. for a period of 6 hours

| Fluid | Additives | Initial wt (g) | Final wt (g) | Wt loss (g) | Mils/yr | Mm/year | lb/ft2 | Note |
|---|---|---|---|---|---|---|---|---|
| 50% Lysine HCl 1:9 + Seawater | 0.5% CI-4A 0.6% CI-2 1% CI-1A | 39.3388 | 38.8587 | 0.480 | 1023.3088 | 25.992 | 0.027 | No pits |

The corrosion testing carried out helps to determine the impact of the use of such synthetic replacement acid composition according to the present invention compared to the industry standard (HCl blends or any other mineral or organic acid blends) when exposed to a variety of temperatures.

The results obtained for the composition containing only HCl were used as a baseline to compare the other compositions when the temperatures of the testing were above 90° C., the temperature at which urea decomposition into ammonia and carbon dioxide starts to occur. Additionally, compositions according to preferred embodiments of the present invention will allow the end user to utilize an alternative to conventional acids that have the down-hole performance advantages, transportation and storage advantages as well as the health, safety and environmental advantages. Enhancement in short/long term corrosion control is an advantage of the present invention versus the use of HCl at temperatures above 90° C. The reduction in skin corrosiveness, the controlled spending nature, and the high salt tolerance are some other advantages of compositions according to the present invention.

Dissolution Testing

In order to assess the effectiveness of the synthetic acid according to a preferred embodiment of the present invention, dissolution testing was carried out to study the dissolution power of various compositions upon exposure to calcium carbonate. The tests were carried out at a temperature of 23° C. and were compared to the efficacy of a solution of 15% HCl and 28% HCl. The results are reported in Table 11 below.

TABLE 11

Dissolution results for various acid compositions and total solubili

| Fluid | Initial Weight | Final Weight | Weight Loss/ g | Acid Solubility % | Total Solubility - kg/m3 |
|---|---|---|---|---|---|
| HC115% | 20.0142 | 9.3023 | 10.7119 | 53.52 | 214 |
| HC115% | 25.0018 | 15.4885 | 9.5133 | 38.05 | 190 |
| HC128% | 20.0032 | 0.9922 | 19.011 | 95.04 | 380 |
| HC128% | 25.0024 | 3.84442 | 21.15798 | 84.62 | 423 |
| Lysine HCl 1:2 | 15.001 | 8.851 | 6.15 | 41.00 | 123 |
| Lysine HCl 1:3 | 15.032 | 5.2723 | 9.7597 | 64.93 | 195 |
| Lysine HCl 1:3.5 | 15.005 | 4.0452 | 10.9598 | 73.04 | 219 |
| Lysine HCl 1:4 | 15.007 | 2.1423 | 12.8647 | 85.72 | 257 |
| Lysine HCl 1:4 diluted with 50% seawater | 15.002 | 9.0221 | 5.9799 | 39.86 | 120 |
| Lysine HCl 1:5 | 15.024 | 1.5857 | 13.4383 | 89.45 | 269 |
| Lysine HCl 1:6 | 20.014 | 4.8421 | 15.1719 | 75.81 | 303 |
| Lysine HCl 1:6 diluted with 50% seawater | 15.003 | 7.9723 | 7.0307 | 46.86 | 141 |
| Lysine HCl 1:7 | 20.052 | 2.7721 | 17.2799 | 86.18 | 346 |
| Lysine HCl 1:9 | 20.0023 | 2.2158 | 17.7865 | 88.92 | 356 |
| Lysine HCl 1:9 | 25.0012 | 6.8558 | 18.1454 | 72.58 | 363 |
| Lysine HCl 1:9 diluted with 50% seawater | 15.0023 | 6.8921 | 8.1102 | 54.06 | 162 |
| Lysine HCl 1:12.5 | 20.0015 | 0.1516 | 19.8499 | 99.24 | 397 |
| Lysine HCl 1:12.5 | 25.0024 | 4.5108 | 20.4916 | 81.96 | 410 |
| Lysine HCl 1:12.5 diluted with 50% seawater | 15.0021 | 5.3341 | 9.668 | 64.44 | 193 |

Further, the dissolution performance of two compositions according to a preferred embodiment of the present invention was tested against the performance of HCl. In one series of tests, compositions containing 100% Lysine-HCl in a ratio of 1:9 (lysine:HCl), in one instance, and in a ratio of 1:12.5 (lysine:HCl), in another instance, were tested against 28% HCl at a temperature of 70° C. The results are reported in FIG. 1. As can be seen from FIG. 1, both compositions of Lysine-HCl provided an improved reaction by extending the time of reaction until fully (or nearly fully) spent. This highlights one of the advantages that the novel synthetic acid compositions according to the present invention provide when used in oil and gas operations for example, in a fracking operation where it is desirable to have an acid which has a controlled, more methodical spending (reacting).

Figure 2:
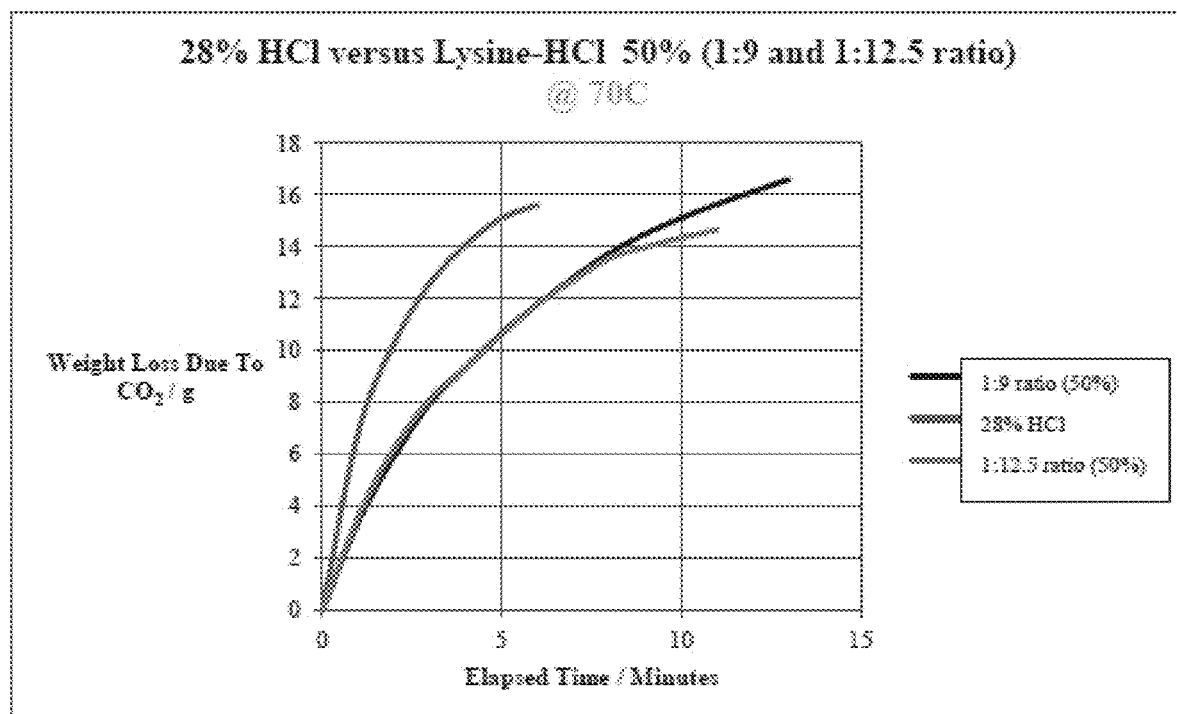
FIG. 2 is a graphical representation of the dissolution of CaCO3 over time at 70° C. by a control and two compositions according to preferred embodiment of the present invention.

In a second series of tests, compositions containing 50% Lysine-HCl in a ratio of 1:9 (lysine:HCl), in one instance, and in a ratio of 1:12.5 (lysine:HCl), in another instance, were tested against 28% HCl at a temperature of 70° C. The results are reported in FIG. 2. As can be seen, both compositions of Lysine-HCl provided an improved reaction by extending the time of reaction until fully (or nearly fully) spent. This again highlights one of the advantages that the novel synthetic acid compositions according to the present invention provide.

Figure 3:
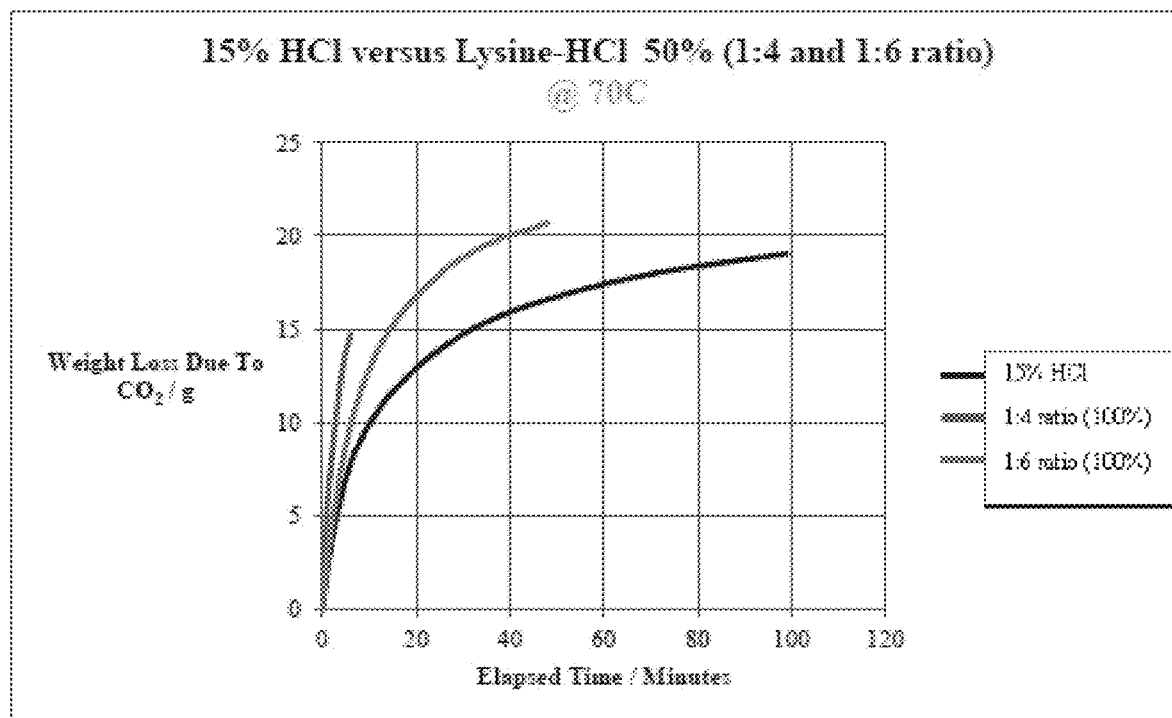
FIG. 3 is a graphical representation of the dissolution of CaCO3 over time at 70° C. by a control and two compositions according to preferred embodiment of the present invention.

In a third test, compositions containing 50% Lysine-HCl in a ratio of 1:4 (lysine:HCl), in one instance, and in a ratio of 1:6 (lysine:HCl), in another instance, were tested against 15% HCl at a temperature of 70° C. The results are reported in FIG. 3. As can be seen, both compositions of Lysine-HCl provided an improved reaction by extending the time of reaction until fully (or nearly fully) spent.

Figure 4:
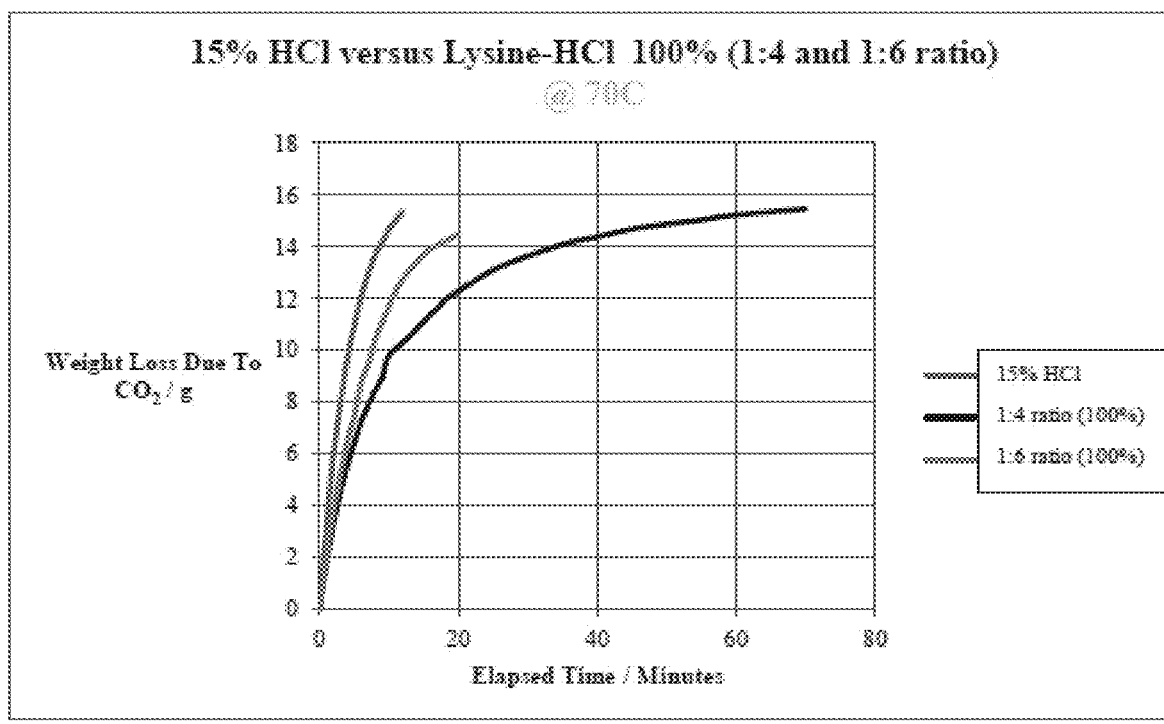
FIG. 4 is a graphical representation of the dissolution of CaCO3 over time at 70° C. by a control 15 and two compositions according to preferred embodiment of the present invention.

In a fourth test, compositions containing 100% Lysine-HCl in a ratio of 1:4 (lysine:HCl), in one instance, and in a ratio of 1:6 (lysine:HCl), in another instance, were tested against 15% HCl at a temperature of 70° C. The results are reported in FIG. 4. As can be seen, both compositions of Lysine-HCl provided an improved reaction by extending the time of reaction until fully (or nearly fully) spent.

Wormholing Testing

Numerous studies of the wormholing process in carbonate acidizing have shown that the dissolution pattern created by the flowing acid can be characterized as one of three types (1) compact dissolution, in which most of the acid is spent near the rock face; (2) wormholing, in which the dissolution advances more rapidly at the tips of a small number of highly conductive micro-channels, i.e. wormholes, than at the surrounding walls; and (3) uniform dissolution. The dissolution pattern that is created depends on the interstitial velocity, which is defined as the acid velocity flowing through the porous medium. Interstitial velocity is related to the injection rate (interstitial velocity=injection rate/(area of low porosity). Compact dissolution patterns are created at relatively low injection rates, wormhole patterns are created at intermediate rates and uniform dissolution patterns at high rates.

This interstitial velocity at the wormhole tip controls the wormhole propagation. The optimal acid injection rate is then calculated based on a semi-empirical flow correlation. At optimal injection rate, for a given volume, acid penetrates the furthest into the formation, resulting in the most efficient outcome of the acid stimulation. Wormhole structures change from large-diameter at low interstitial velocity to thin wormholes at optimal velocity conditions, to more branched patterns at high interstitial velocity.

This series of experimental testing study examined a composition according to the present invention where the composition had a lysine:HCl ratio of 1:4.5. This composition is designed as a low-hazard/low-corrosion aqueous synthetic acid enhanced through the addition of proprietary oilfield chemistry to replace standard HCl blends, especially for high to ultra-high temperature and/or safety critical applications (i.e. offshore applications).

The acid system according to the present invention was compared to 15% HCl under the exact same testing conditions. The wormhole efficiency curve (pore volume to breakthrough vs interstitial velocity) was determined for both acid systems for comparison. It was concluded that the lysine:HCl composition has the similar optimal pore volume of breakthrough at a 50% lower of optimal interstitial velocity compared with HCl.

Test Parameters

Two series of matrix acidizing experiments were conducted in order to evaluate the performance of above mentioned composition according to the present invention (lysine:HCl in a 1:4.5 ratio) vs 15% HCl. The experiments utilized a 90% lysine:HCl (in a 1:4.5 ratio) composition comprising 0.3 vol % common commercial corrosion inhibitor, and the other set of experiments utilized a 15% solution of HCl with 0.3 vol % of a corrosion inhibitor. The experiments were conducted utilizing Indiana limestone cores.

All cores were 1.5-inch in diameter and 8-inch in length. The average porosity of the core samples was 12.8% and the average permeability was 40 mD. The back pressure used in these experiments was 2000 psi. The testing temperature was 180° F. (82° C.). The limestone cores were selected as they help in simulating the geology encountered most commonly in oilfields in North America.

Test Procedure

The matrix acidizing apparatus consists of a pumping system, an accumulation system, a core containment cell, a pressure maintaining system, a heating system and a data acquisition system. A Teledyne Isco® syringe pump was used to inject water and acid at constant rates. A back pressure regulator was used to maintain the desired minimum system pressure at 2000 psi. Confining pressure was set to 400-500 psi higher than the injection pressure to avoid fluid leaking. Two heating tapes were used to heat the core holder and the injection fluid for the high-temperature tests. During the experiment, the system was first pressurized by injecting water, once the flow reached a steady state; permeability was calculated from the measured pressure differential across the core containment cell. The system was then heated to the experiment temperature. When the full system; fluid, core containment cell and core reached the target temperature, water injection was ceased and acid injection commenced.

Injection was ceased when wormholes breach the core and acid injection time was recorded for the breakthrough pore volume calculation. For each experimental condition, 4-6 individual tests were performed with the same temperature and pressure parameters. The only condition that changed was the injection rate. The rate varied in a range until the optimal condition was identified. The Buijse and Glasbergen (2005) model was utilized to generate the wormhole efficiency relationship by fitting the experimental data obtained.

Core Properties

The cores utilized for testing were 1.5 inches in diameter and 8 inches long. Indiana limestone 30 samples were obtained from one sample of outcrop to ensure linear properties.

Experimental Results

The experimental results for HCl are listed in Table 12 below. The experimental results for the lysine:HCl composition are listed in Table 13.

TABLE 12

Wormholing Experiment #1 - Experimental Results for HCl

| Core# | Acid injection rate (ml/min) | Interstitial Velocity (cm/min) | Pore Volume to Breakthrough |
|---|---|---|---|
| IC2 | 10 | 6.39 | 0.52 |
| IC1 | 8 | 4.53 | 0.60 |
| IC3 | 7 | 4.97 | 0.60 |
| IC5 | 5 | 3.47 | 0.51 |
| IC6 | 3 | 2.10 | 0.47 |
| IC16 | 2 | 1.56 | 0.64 |
| IC18 | 0.8 | 0.62 | 2.93 |

TABLE 13

Wormholing Experiment #1 - Experimental Results for the Lysine-HCl composition

| Core# | Acid injection rate (ml/min) | Interstitial Velocity (cm/min) | Pore Volume to Breakthrough |
|---|---|---|---|
| IC19 | 5 | 3.71 | 0.60 |
| IC13 | 12 | 8.77 | 0.84 |
| IC22 | 3 | 2.11 | 0.47 |
| IC20 | 8 | 5.83 | 0.80 |
| IC21 | 2 | 1.40 | 0.77 |
| IC17 | 1 | 0.70 | 0.91 |
| IC14 | 2 | 1.38 | 0.65 |
| IC15 | 1 | 0.70 | 1.18 |
| IC11 | 1.3 | 0.78 | 0.45 |
| IC10 | 0.8 | 0.50 | 0.73 |
| IC12 | 1.6 | 0.99 | 0.47 |

The optimal condition for two sets of experiments with Buij se and Glasbergen equation are listed in Table 14. The CT scans for both acid systems under the same conditions of 3 ml/min and a (2.1 cm/min) interstitial velocity.

TABLE 14

Optimal Condition Obtained from Experimental Results from Wormholing Experiment #1

| | HCl | 90% Lysine:HCl 1:4.5 ratio |
|---|---|---|
| Optimal Pore Volume to Breakthrough | 0.46 | 0.48 |
| Optimal Interstitial Velocity (cm/min) | 1.97 | 1.02 |

According to the optimal wormhole efficiency theory, wormhole diameter is supposed to increase when the injection velocity decreases and the stimulation begins losing efficiency at low injection rates. This is not observed during this study utilizing the lysine:HCl composition. At a low injection rate (0.8 ml/min (0.5 cm/min)) the HCl core developed a large-diameter wormhole and the wormhole propagation velocity is slow. The test stopped because the sleeve for confining pressure was broken by compact dissolution exhibited with HCl. On the contrast, the lysine:HCl composition showed a wormhole diameter similar to the more optimal injection rate (higher injection rate). At 1.6 ml/min, the wormholes created by the lysine:HCl composition were much smaller (desired) than the ones created by the 15% HCl composition. This shows that the lysine:HCl composition according a preferred embodiment of the present invention has higher stimulation efficiency in general compared with HCl, especially at lower injection rate.

Preliminary observations of wormhole efficiency tests #1: the optimal interstitial velocity for the lysine:HCl composition is lower than 15% HCl providing a potential advantage over conventional HCl acid systems. The objective is to obtain fast wormhole propagation (high stimulation efficiency) without being limited by injection rate in the field and the lysine:HCl composition exhibits this effect; and the optimal pore volume to breakthrough for the lysine:HCl composition is similar to the one from the 15% HCl composition. With retarding or corrosion prevention features, other acid systems usually have increased pore volume to breakthrough because of reduced reaction rates. This negative effect is not observed in the present case with the lysine:HCl composition as tested.

Wormholeina Experiment #2

Test Parameters

Two series of matrix acidizing experiments were conducted in order to evaluate the performance of a lysine:HCl composition (1:4.5 ratio of lysine:HCl) vs 15% HCl. One set of experiments utilized a 90% lysine:HCl composition comprising a 0.3 vol % of a corrosion inhibitor, and the other set of experiments utilized a 15% solution of HCl with a 0.3 vol % of a corrosion inhibitor. The experiments were conducted utilizing Silurian Dolomite cores. All of the core samples are 1.5 by 8 inches and 3 of the core samples are 1.5 by 6 inches. The average porosity of the core samples was 12.6% and the average permeability was 92.83 mD. The back pressure used in these experiments was 2000 psi. The testing temperature was 180° F. (82° C.). The dolomite cores were selected as they help in simulating the geology encountered most commonly in oilfields in the Middle East.

Test Procedure

The test procedure is the same as for wormholing experiment #1.

Core Properties

The cores utilized for testing are 1.5 in diameter and 8 in long (D1-D11), 1.5 in diameter and 6 in long (D12-D14) Silurian Dolomite samples were obtained from one sample of outcrop to ensure linear properties. The average porosity of the core samples was 12.6% and the average permeability was 92.83 mD. Upon XRD of the cores it was determined that the mineralogy of the core samples was almost 100% dolomite.

Experimental Results

The experimental results for HCl 15% are listed in Table 15. Results for the lysine:HCl composition are listed in Table 16.

TABLE 15

Wormholing Experiment #2 - Experimental Results for HCl

| Core# | Acid injection rate(ml/min) | Interstitial Velocity(cm/min) | PVbt |
|---|---|---|---|
| D1 | 5 | 3.58 | 2.47 |
| D2 | 8 | 5.59 | 2.9 |
| D3 | 3 | 2.08 | 2.06 |
| D4 | 2 | 1.34 | 1.9 |
| D12 | 1.5 | 1.07 | 1.87 |
| D14 | 1 | 0.67 | 2.34 |

TABLE 16

Wormholing Experiment #2 - Experimental Results for 90% Lysine:HCl 1:4.5 ratio

| Core# | Acid injection rate(ml/min) | Interstitial Velocity(cm/min) | PVbt |
|---|---|---|---|
| D6 | 1 | 0.67 | 3.1 |
| D7 | 3 | 2.15 | 2.34 |
| D8 | 2 | 1.46 | 1.91 |
| D10 | 1.5 | 1.14 | 2.18 |
| D11 | 5 | 3.33 | 2.88 |
| D13 | 8 | 5.57 | 2.85 |

TABLE 16-continued

To understand the core flood results, the pore volume to breakthrough was plotted versus interstitial velocity and then applied the Buij se and Glasbergen model to curve-fit the experimental data to identify the optimal condition. The optimal condition for the two sets of experiments with Buij se and Glasbergen equation are listed in Table 17.

TABLE 17

Optimal Condition Obtained from Experimental Results (from the Buijse and Glasbergen model) from Wormholing Experiment #2

|  | HCl | 90% Lysine:HCl 1:4.5 ratio |
|---|---|---|
| Optimal Pore Volume to Breakthrough | 1.69 | 1.88 |
| Optimal Interstitial Velocity (cm/min) | 1.09 | 1.22 |

The preliminary observations of wormhole efficiency testing #2: the optimal pore volume to breakthrough for the 90% lysine:HCl composition is slightly higher than that of 15% HCl; the optimal interstitial velocity for HCR-6000 90% is in the comparable range of that of 15% HCl; and the pore volume to breakthrough for higher injection rates (above optimal) is similar for both systems.

Wormholint Experiment #3

Test Parameters

Two series of matrix acidizing experiments were conducted in order to evaluate the performance of a 90% composition of lysine:HCl in a 1:4.5 ratio and a 50% composition of lysine:HCl in a 1:6.5 ratio vs 15% HCl. A first set of experiments utilized a 90% composition lysine:HCl in a 1:4.5 ratio with 0.3 vol % of a corrosion inhibitor, a second set of experiments utilized a 50% composition of lysine:HCl in a 1:6.5 ratio with 0.3 vol % of a corrosion inhibitor and the third set of experiments utilized a 15% solution of HCl with 0.3 vol % of a corrosion inhibitor. The experiments were conducted utilizing Kansas Chalk cores. All cores were 1.5-inch in diameter and 6-inch in length. The average porosity of the core samples was 33% and the average permeability was 1.57 mD. The back pressure used in these experiments was 1200 psi. The testing temperature was 70° F. (21° C.): The chalk cores were selected as they help in simulating the geology encountered most commonly in oilfields in the North Sea. NOTE: Increasing confining pressure due to the need of using a higher back pressure at higher temperatures cracked the chalk cores, as such the tests were conducted at ambient temperature. Previously published laboratory testing has shown little variance in results with higher temperatures.

Test Procedure

The test procedure is the same as for wormholing experiment #1.

Core Properties

The cores utilized for testing were 1.5 in. diameter and 6 in. long (KC3-KC11). The Kansas Chalk had an average permeability of 1.57 and porosity of 33%.

Experimental Results

The experimental results for HCl 15% are listed in Table 18. Results for the 90% lysine:HCl in a 1:4.5 ratio composition are listed in Table 19. Results for the 50% lysine:HCl composition (in a 1:6.5 ratio) are listed in Table 20.

TABLE 18

Wormholing Experiment 3 - Experimental Results for 15% HCl

| Core# | Acid injection rate(ml/min) | Interstitial Velocity(cm/min) | PVbt |
|---|---|---|---|
| KC3 | 5 | 1.32 | 0.26 |
| KC4 | 3 | 0.83 | 0.22 |
| KC5 | 1 | 0.26 | 0.65 |
| KC6 | 2 | 0.53 | 0.28 |

TABLE 119

Wormholing Experiment #3 - Experimental Results for the composition of 90% L sine:HCl in a 1:4.5 ratio

| Core# | Acid injection rate(ml/min) | Interstitial Velocity(cm/min) | PVbt |
|---|---|---|---|
| KC7 | 3 | 0.77 | 0.32 |
| KC8 | 1 | 0.25 | 0.34 |
| KC9 | 2 | 0.56 | 0.25 |
| KC10 | 0.6 | 0.15 | 0.57 |
| KC11 | 5 | 1.28 | 0.36 |

TABLE 20

Wormholing Experiment #3 - Experimental Results for the composition of 50% L sine:HCl in a 1:6.5 ratio

| Core# | Acid injection rate(ml/min) | Interstitial Velocity(cm/min) | PVbt |
|---|---|---|---|
| KC12 | 3 | 0.8 | 0.48 |
| KC13 | 1 | 0.27 | 1.63 |
| KC14 | 5 | 1.29 | 0.39 |
| KC15 | 2 | 0.53 | 0.33 |

To understand the core flood results, the pore volume to breakthrough was plotted versus interstitial velocity and then applied the Buij se and Glasbergen model to curve-fit the experimental data to identify the optimal condition. The optimal condition obtained for the three sets of experiments with Buij se and Glasbergen equation are listed in Table 21.

TABLE 21

Optimal Condition Obtained from Experimental Results (using the Buijse and Glasber en model) from Wormholin Experiment #3

|  | HCl15% | 90% Lysine:HCl 1:4.5 ratio | 50% Lysine:HCl - 1:6.5 ratio |
|---|---|---|---|
| Optimal Pore Volume to Breakthrough | 0.22 | 0.24 | 0.36 |
| Optimal Interstitial Velocity (cm/min) | 0.63 | 0.33 | 0.76 |

The 90% lysine:HCl composition has the same level of pore volume to breakthrough compared with HCl 15%, with the optimal interstitial velocity about 50% lower than for HCl 15%. This data shows that at low injection rates (below the optimal injection rate for 15% HCl, the 90% lysine:HCl composition has a significant lower pore volume to breakthrough. The pore volume to breakthrough and interstitial velocity results for the 50% lysine:HCl composition (in a 1:6.5 ratio), although somewhat higher than those of the 15% HCl, are marked improvements over other known retarded acid compositions. The results for the 50% lysine:HCl composition (in a 1:6.5 ratio) also indicate that the optimum concentration of a 1:6.5 composition for a more appropriate comparison with 15% HCl would be a dilution to 75% of the 1:6.5 concentrate. In that case, the acid content would be similar to that of the 15% HCl composition and of the 90% lysine:HCl composition (in a 1:4.5 ratio).

The Buij se—Glasbergen wormhole propagation model uses the optimum values obtained from the curve fit to calculate the wormhole propagation velocity, which is then used to calculate the wormhole length. The longer the wormhole, the better the stimulation outcome. As injection proceeds, wormholes become longer, and wormhole propagation rate decreases. For long contact (such as horizontal wells), lower interstitial velocity sometimes is unavoidable, and the acid system that has lower optimal interstitial velocity but comparable pore volume of breakthrough will have major advantage. Additionally, the data recorded was compared to analyze the wormhole propagation at various rates using both the 15% HCl and the 90% lysine:HCl (1:4.5 ratio) composition. What came out of the comparison is that, for a wellbore with 0.4-ft radius and 1000-ft contact length, the 90% lysine:HCl (1:4.5 ratio) composition excelled as a retarded acid but also produced an increased wormhole penetration at both injection rates tested.

Additionally, it was found that there was additional skin reduction using the 90% lysine:HCl (1:4.5) ratio composition due to the improvement in wormhole propagation. Typically, retarded acids would have higher pore volume of breakthrough (PVBT) and, from a wormholing point of view, retarded acids typically do not have an advantage on wormhole propagation. The lysine:HCl composition did not exhibit this disadvantage as a retarded acid. The preliminary observations from the experimental wormhole efficiency tests utilizing the 90% lysine:HCl (in a 1:4.5 ratio) composition include the following: the optimal interstitial velocity for the lysine:HCl composition is almost 50% lower than 15% HCl providing a potential advantage over conventional HCl acid systems by allowing operators to stimulate at optimal condition without extremely high injection rates; and the lysine:HCl composition shows a comparable optimum PVBT in comparison to the 15% HCl system tested. Combined with low optimal interstitial velocity, the acid composition according to a preferred embodiment of the present invention can improve stimulation efficiency, especially in rate-limited applications.

Stability Testing

Testing was carried out using pressurized ageing cell with Teflon liner in order to assess the stability of various lysine-HCl compositions according to the present invention. The tests were conducted at a pressure of 300 psi (denoted by an asterisk) and at 400 psi (all other compositions). The results of the tests are reported in Table 22 below.

In order to assess the stability of synthetic acids containing urea, the stability of urea was tested by only considering its exposure to higher temperature. Urea 50% diluted with 50% seawater @ 180° C. for 8 h. The following information was gathered during this testing: pH before exposure to high temperature: 7.61; pH after exposure to high temperature: 9.44 and observation of a strong ammonia smell. This confirms that synthetic acids containing urea have decreasing stability when heated above 90° C. and are less desirable to use than compositions according to the present invention which have stability when exposed to temperatures above 200° C.

TABLE 22

Stability Test Using Pressurized Ageing Cell with Teflon Liner

| Fluid | Temp (C) | Test Duration hours | pH before spending | pH after spending | pH after thermal treatment | Solubility before kg/m3 | Precipitation |
|---|---|---|---|---|---|---|---|
| Spent Lysine-HCl 1:3 + 50% Seawater | 130 | 18 | | | | 195 | No |
| Spent Lysine-HCl 1:3.5 + 50% Seawater * | 150 | 18 | | | 2.19 | 219 | No |
| Spent Lysine-HCl 1:7 + 50% Seawater * | 150 | 18 | | | 1.85 | 346 | No |
| Spent Lysine-HCl 1:3.5 + 50% Seawater * | 180 | 8 | | | | 219 | No |
| Spent Lysine-HCl 1:7 + 50% Seawater * | 180 | 8 | | | | | No |
| Spent Lysine-HCl 1:4 + 50% Seawater | 150 | 8 | 0.64 | 2.58 | 3.7 | | No |
| Spent Lysine-HCl 1:6 + 50% Seawater | 150 | 8 | 0.45 | 2.33 | 2.29 | | No |
| Spent Lysine-HCl 1:9 + 50% Seawater | 150 | 8 | 0.35 | 1.38 | 1.34 | | No |
| Spent Lysine-HCl 1:4 + 50% Seawater | 180 | 8 | 0.65 | 2.46 | 2.42 | | No |
| Spent Lysine-HCl 1:6 + 50% Seawater | 180 | 8 | 0.46 | 2.25 | 2.24 | | No |
| Spent Lysine-HCl 1:9 + 50% Seawater | 180 | 8 | 0.34 | 1.93 | 1.97 | | No |
| Spent Lysine-HCl 1:4 + 50% Seawater | 200 | 8 | 0.65 | 2.56 | 2.6 | | No |
| Spent Lysine-HCl 1:6 + 50% Seawater | 200 | 8 | 0.46 | 2.36 | 2.39 | | No |
| Spent Lysine-HCl 1:9 + 50% Seawater | 200 | 8 | 0.34 | 2.02 | 2.83 | | No |

Dermal Testing

The objective of this study was to evaluate the dermal irritancy and corrosiveness of the composition of Example 1, following a single application to the skin of compositions of lysine-HCl of 5 1:3.5 molar ratio, 1:5 molar ratio and 1:7 molar ratio.

The test surface (human skin located on the back of the hand) was exposed to lysine-HCl compositions of varying ratios—1:3.5, 1:5 and 1:7. Visual observation of the exposed areas was carried out over time intervals of 15, 30 45 and 60 minutes. The surface was washed after exposure and results were recorded as observations of the surface.

Observations recorded show that there was no blistering or redness effect with any of the 3 concentrations tested. With both higher concentrations the skin was smoothened after the test.

Dermal Testing

The study objective was to determine skin corrosion and/or dermal irritancy potential of a composition according to the present invention according to US DOT 49 CFR Part 173.137, Class 8-Assignment of Packing Group, for Canada TDG agency. If not corrosive by DOT criteria, primary dermal irritation potential of the test substance according to OECD 404 method was determined. These tests were conducted according to approved protocol. There were no deviations from the protocol that affected study quality or outcome. All procedures in this series of test were in compliance with Animal Welfare Act Regulations.

A skin corrosion/dermal irritation study was conducted on three albino rabbits using a sample of a composition according to the present invention where the lysine-HCl ratio is 1:4.5 to determine skin corrosion potential of the test substance. Since the composition was deemed non-corrosive by DOT criteria, the potential for primary dermal irritation was evaluated. There were three intact skin test sites per animal. Each test site was treated with 0.5 ml of undiluted test substance. Test sites were dosed sequentially to permit removal of test substance and observation of treated sites for dermal irritation and defects at several predetermined observation times. The first site was dosed for 3 minutes, then washed and observed. A second site was dosed, wrapped for 1 hour, and washed; then both first and second test sites were observed. A third site was dosed and wrapped for 4 hours. One hour after unwrapping and washing the third site, all three test sites were observed for signs of skin irritation and/or corrosion. Observations were conducted after at—24, 48 and 72 hours, and at 7, 10 and 14 days after final unwrap. Tissue destruction (necrosis or ulceration) was not observed in any animals within the skin corrosion evaluation period. The test substance is considered non-corrosive by DOT criteria when applied to intact skin of albino rabbits.

Dermal irritation was observed in all animals in the primary skin irritation segment of the test. A Primary Irritation Index (PII) of 1.0 (out of a possible 8.0) was obtained based on 1, 24, 48 and 72-hour observations (4 hour exposure site only) for irritation, and that value was used to assign a descriptive rating of slightly irritating.

Exposure to Iron

A composition according to a preferred embodiment of the present invention was tested for stability in the presence of iron (III). The performance was compared to HCl.

It was determined that the composition according to a preferred embodiment of the present invention demonstrated stability up to a pH of 5.5 without sludging or precipitation of the solubilized or suspended iron. Comparatively, under the same testing conditions, HCl only provided stability up to pH-1.5. Full precipitation in the case of HCl was observed at a pH of approximately 2.5.

This illustrates yet another advantage of a preferred embodiment of the present invention in its use when spent acid is subsequently sent back to a production facility without "causing an operational disruption" as is often the case with spent HCl acid. This iron sequestering effect can provide significant value for oilfield operators who encounter problems with the presence of iron sulfide for example.

Scale Solubility

The power of a composition according to the present invention to solubilise commonly encountered oilfield scales was investigated, the results are found in Table 23. It was determined that the composition of Example 2 provides an excellent solubilizing ability when dealing with various oilfield scales. Its solubilizing ability is comparable to the solubility of most many mineral and organic acid packages typically utilized.

TABLE 23

Solubility of various oilfield scales upon Exposure to the Composition of Example 2

| Scale | Concentration of composition of Example 2 | Total Solubility kg/m3 |
|---|---|---|
| Calcium Carbonate | 100% | 220 |
| Calcium Carbonate | 50% | 130 |
| Dolomite | 100% | 200 |
| Dolomite | 50% | 130 |
| Iron Sulfide | 100% | 130 |
| Iron Sulfide | 50% | 70 |

Elastomer Compatibility

When common sealing elements used in the oil and gas industry come in contact with acid compositions they tend to degrade or at least show sign of damage. A number of sealing elements common to activities in this industry were exposed to a composition according to a preferred embodiment of the present invention to evaluate the impact of the latter on their integrity. More specifically, the hardening and drying and the loss of mechanical integrity of sealing elements can have substantial consequences on the efficiency of certain processes as breakdowns require the replacement of defective sealing elements. Testing was carried out to assess the impact of the exposure of composition of Example 2 to various elastomers. Long term (72 hour exposure) elastomer testing on the concentrated product of Example 2 at 70° C. and 28,000 kPa showed little to no degradation of various elastomers, including Nitrile® 70, Viton® 75, Alias® 80 style sealing elements, the results are reported in Table 24. This indicates that the composition of Example 2 is compatible with various elastomers typically found in the oil and gas industry.

TABLE 24

Elastomer compatibility data for HCR-6000TM - 3 days at 70° C.

| Elastomer | Weight before | Weight after | Weight Change | Thickness before | Thickness after |
|---|---|---|---|---|---|
| Viton ® 750 | 3.11 g | 3.2055 g | 0.0955 g | 0.133 inches | 0.136 inches |
| Nitrile ® 70 | 2.0774 g | 2.1517 g | 0.0743 g | 0.135 inches | 0.135 inches |
| Atlas ® 80 | 2.9139 g | 3.1367 g | 0.2228 g | 0.137 inches | 0.141 inches |

Uses of Compositions According to Preferred Embodiments of the Present Invention The uses (or applications) of the compositions according to the present invention upon dilution thereof ranging from approximately 1 to 90% dilution are listed below in Table 25 and include, but are not limited to: injection/disposal treatments; matrix acid squeezes, soaks or bullheads; acid fracturing, acid washes; fracturing spearheads (breakdowns); pipeline scale treatments, cement breakdowns or perforation cleaning; pH control; and de-scaling applications, high temperature (up to 180° C.) cyclical steam scale treatments and steam assisted gravity drainage (SAGD) scale treatments (up to 220° C.) As would be understood by the person skilled in the art, the methods of use generally comprise the following steps: providing a composition according to a preferred embodiment of the present; exposing a surface (such as a metal surface) to the acid composition; allowing the acid composition a sufficient period of time to act upon said surface; and optionally, removing the acid composition when the exposure time has been determined to be sufficient for the operation to be complete or sufficiently complete. Another method of use comprises: injecting the acid composition into a well and allowing sufficient time for the acid composition to perform its desired function. Yet another method according to the present invention comprises the steps of: providing a composition according to a preferred embodiment of the present; injecting the composition into a well; an optional step of dilution of the acid composition can be performed if deemed necessary prior to injection downhole; monitoring the various injection parameters to ensure that the pressure and rate of injection are below frac pressures and below conventional injection rates used for conventional acids such as HCl; allowing sufficient period of time to act upon said formation to obtain the desired wormholing effect; and optionally, removing the acid composition when the exposure time has been determined to be sufficient for the operation to be complete or sufficiently complete. Yet another method of use comprises: exposing the acid composition to a body of fluid (typically water) requiring a decrease in the pH and allowing sufficient exposure time for the acid composition to lower the pH to the desired level.

TABLE 25

Applications for which compositions according to the present invention can be used as well as proposed dilution ranges

| Application | Suggested Dilution | Benefits |
|---|---|---|
| Injection/Disposal Wells | 10%-75% | Compatible with mutual solvents and solvent blends, very cost effective. |
| Squeezes & Soaks Bullhead Annular | 33%-75% | Ease of storage & handling, cost effective compared to conventional acid stimulations. Ability to leave pump equipment in wellbore. |
| Acid Fracs | 50%-90% | Decreased shipping and storage compared to conventional acid, no blend separation issues, comprehensive spend rate encourages deeper formation penetration. |
| Frac Spearheads (Break-downs) | 33%-66% | Able to adjust concentrations on the fly. Decreased shipping and storage on location. |
| Cement Break-downs | 20-75% | Higher concentrations recommended due to lower temperatures, and reduced solubility of aged cement pH Control 0.1%-1.0% Used in a variety of applications to adjust pH level of water based systems. |
| Liner De-Scaling, Heavy Oil | 1%-25% | Continuous injection/de-scaling of slotted liners, typically at very high temperatures. |
| Matrix acidizing | 70-100% | Allows the use of lower injection rates, no need for frac crews; better wormholing; less acid volume needed; therefore less trucking costs, less disposal volumes/costs; higher well production rate; extended well life time; fewer re-acidizing cycles necessary |

The main advantages of the use of the synthetic acid composition included: the reduction of the total loads of acid, and the required number of tanks by delivering concentrated product to location and diluting with fluids available on location (with low to high salinity production water). Other advantages of the composition according to the present invention include: operational efficiencies which lead to the elimination of having to periodically circulate tanks of HCl acid due to chemical separation; reduced corrosion to downhole tubulars; ultra-high temperature corrosion protection up to 220° C., less facility disruptions due to iron pick up and precipitation, thermal stability of a synthetic acid, and reduced hazardous HCl acid exposure to personnel and environment by having a non-low hazard, low fuming acid (lower vapour pressure) on location.

A synthetic acid composition according to a preferred embodiment of the present invention, can be used to treat scale formation in SAGD operations at ultra-high temperatures (up to 220° C.) while achieving acceptable corrosion limits set by industry. This also eliminates the need for the SAGD operation to be halted for a "cool down prior to a scale treatment and said synthetic acid is injected into said well to treat scale formation inside said well at high temperatures.

Oil Compatibility Testing

Oil compatibility testing was carried out using the compositions of Example 2 and Example 3.

Procedure

Oil compatibility was tested for a 50% dilution of the compositions of Example 2 and Example 3 including corrosion components and an additional non-emulsifier at a 1% and 2% concentration. 50 ml of the 50% Example 2 composition was filled into a shake bottle and heated to 70° C. for 30 minutes. The heavy oil sample was heated to 70° C. 50 ml of the oil was added to the shake bottle to give a total solution of 100 ml and gently inverted 5 times for ca. 90° in both directions. A picture was taken after 1 minute, 5 minutes, 15 minutes and 30 minutes. The sample was kept at 70° C. in the water bath.

Results and Observations

The compositions of Example 2 and Example 3 show a better non-emulsification property with the addition of a non-emulsifier. The phase separation is superior during the observed time period and occurs faster. A loading of 1% of non-emulsifier was sufficient for a quick phase separation.

While the foregoing invention has been described in some detail for purposes of clarity and understanding, it will be appreciated by those skilled in the relevant arts, once they have been made familiar with this disclosure that various changes in form and detail can be made without departing from the true scope of the invention in the appended claims.

The invention claimed is:

1. A method of recovering a spent acid during oilfield operations comprising the steps of:
   providing a composition of lysine and hydrochloric acid present in a molar ratio ranging from 1:3 to 1:12.5, said composition having a pH below 1 and said composition being stable at temperatures of up to 200° C.;
   injecting said composition into an oil or gas well to perform a treatment;
   allowing sufficient time of acid exposure in the well by said composition to perform said treatment and to generate a spent acid having a pH ranging between 1 and 4;
   recovering the spent acid from the well; and
   sending the spent acid to a treatment plant without incurring any additional chemical treatment steps.

* * * * *